May 13, 1969  E. D. SMITH  3,443,270
AUTOMATIC CAR WASHING APPARATUS
Filed Dec. 29, 1966  Sheet 1 of 4

INVENTOR.
EARL DALLAS SMITH
BY
Woodard, Weikart, Emhardt & Naughton

May 13, 1969     E. D. SMITH     3,443,270

AUTOMATIC CAR WASHING APPARATUS

Filed Dec. 29, 1966     Sheet 2 of 4

INVENTOR.
EARL DALLAS SMITH

BY

Woodard, Weikart, Emhardt & Naughton

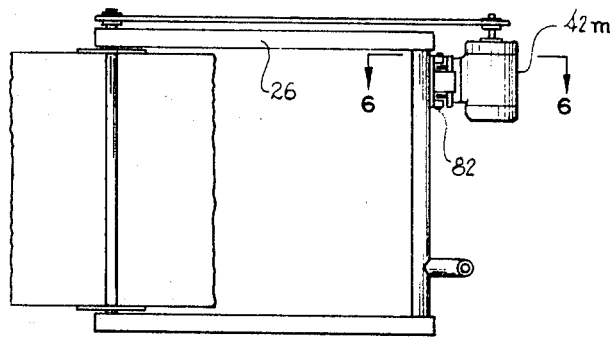
FIG. 5
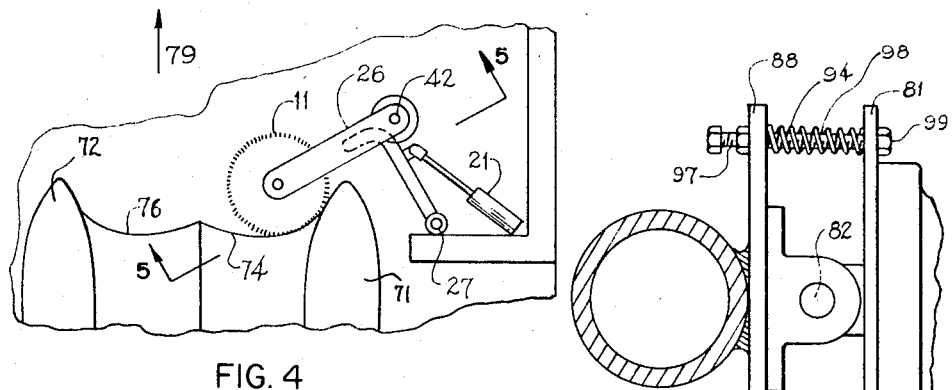
FIG. 4
FIG. 6
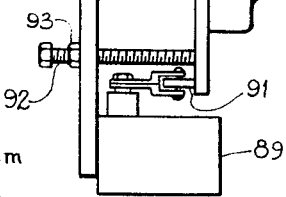
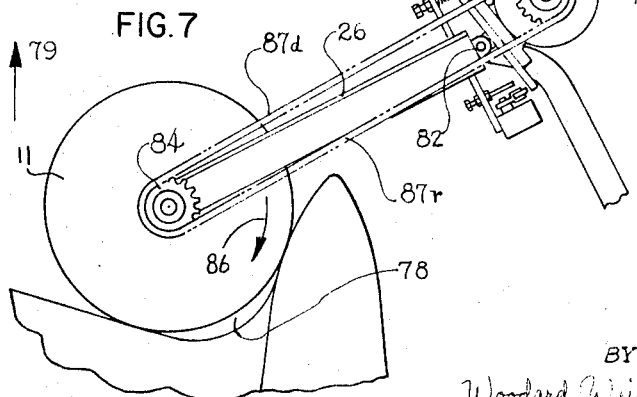
FIG. 7
INVENTOR.
EARL DALLAS SMITH INVENTOR.
EARL DALLAS SMITH
BY
Woodard, Weikart, Emhardt & Naughton

United States Patent Office 3,443,270
Patented May 13, 1969

3,443,270
AUTOMATIC CAR WASHING APPARATUS
Earl Dallas Smith, 6202 E. Sage Drive,
Scottsdale, Ariz. 85251
Filed Dec. 29, 1966, Ser. No. 605,847
Int. Cl. B08b 1/02
U.S. Cl. 15—21                             19 Claims

ABSTRACT OF THE DISCLOSURE

A vehicle antenna sensor wand mounted to an overhead structure responds to engagement by the antenna to terminate rotation of a vehicle scrubbing brush for collapse of the bristles to avoid engagement thereof with the antenna. A brush drive motor is mounted to a brush arm on a pivotal mounting tiltable in response to brush loading to cause an actuator to retract the brush arm momentarily for reduced brush pressure on the vehicle, followed by resumption of normal brush loading on the vehicle.

BACKGROUND OF THE INVENTION

This invention relates generally to automatic car washing apparatus and more particularly to apparatus sensing and responsive to vehicle position for controlling brush application and loading.

In car washing apparatus, it is desirable to minimize manual labor and attention as much as possible. However, when one considers the various sizes and shapes of cars available, and the various appendages mounted thereto including ornaments, rear view mirrors, and radio antennas, he realizes that in order to be certain that the car is properly washed without damage to any portion thereof, either the apparatus used must accommodate such things or considerable personal attention and care must be taken by the operator during the brushing phase of a car washing cycle. In either case, with existing equipment prior to the present invention, considerable manual labor in afterwork could be expected with certain cars.

It is therefore a general object of the present invention to provide improved car washing apparatus.

A further object is to provide car washing apparatus which automatically senses the presence and location of a radio antenna thereon and controls brush operation to avoid damage thereto.

A further object is to provide automatic car washing apparatus capable of working in frontal recesses on the car and yet arranged to avoid damage either to the apparatus or to the vehicle as it moves along.

A further object is to provide apparatus of the foregoing character which is automatic in operation and responds to vehicle position with relationship to the apparatus to initiate certain controlled events.

Described briefly, in a typical embodiment of the present invention, car washing brushes are provided with flexible or normally limp bristles so that when the brushes are at rest the bristles hang vertically but when the brushes are rotated on vertical axes, the bristles move out and extend horizontally. Sensing means are provided to control application of these brushes to the vehicle. In one example, the sensing means is in the form of a brush torque sensor so that when rotational effort has reached a certain predetermined maximum allowable value, the brush applicator is reversed and the brush moved away from the surface of the car momentarily to relieve the load. In another example there is a sensor responsive to movement by the vehicle antenna to stop operation of a brush and allow the bristles to hang free of the car so as to avoid working of the brush on the antenna. In each event, resumption of brush activity on the car is provided after the obstruction or impediment has been overcome or bypassed.

The full nature of the invention will be understood from the accompanying drawings and the following description and claims.

FIG. 4 is an enlarged fragmentary top plan view illustrating the application of a right front brush in a recess typical of certain frontal configurations of recent model automobiles.

FIG. 5 is a sectional view taken along the line 5—5 in FIGURE 4 and viewed in the direction of the arrows.

FIG. 6 is a further enlarged sectional view taken along the line 6—6 in FIGURE 5 and illustrating some details of the brush control means used for the front brush.

FIG. 7 is another fragmentary top plan view like FIGURE 4 but on a scale intermediate those of FIGURES 4 and 6 and showing the motor mounting frame rocking in response to increased brush loading to initiate the unloading action.

Figure 1:
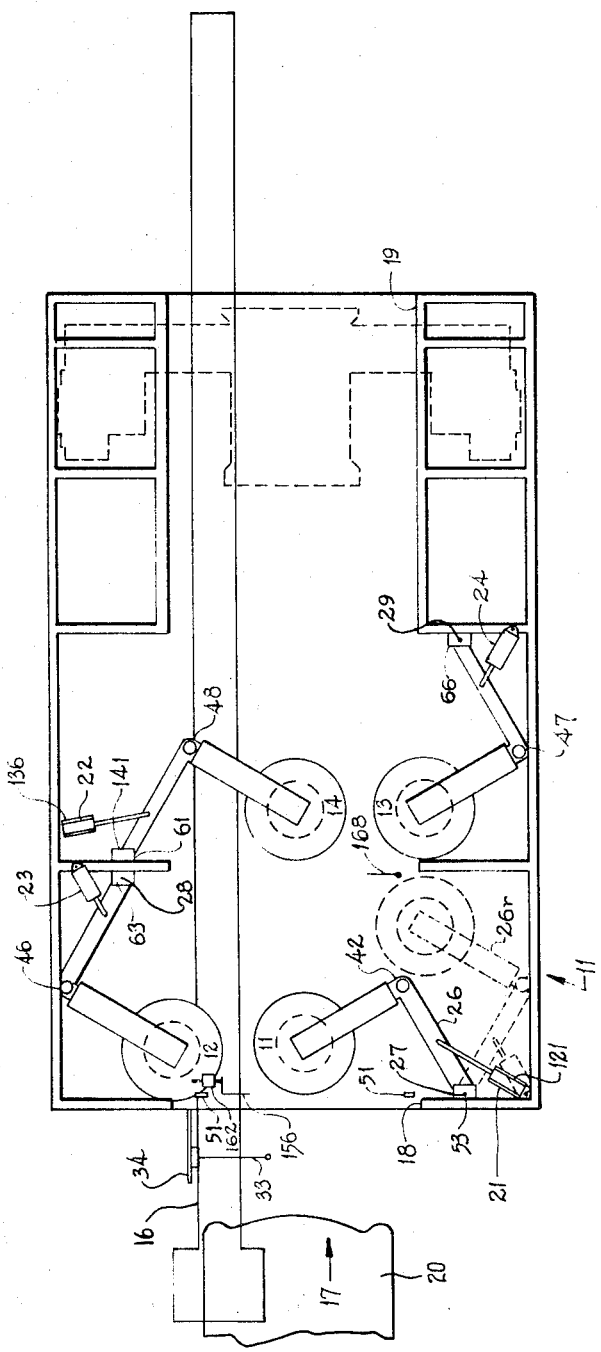
FIG. 1 is a top plan view of a car wash apparatus according to a typical embodiment of the invention showing generally the brush and the sensor wand locations.

Referring now to the drawings in detail and particularly FIGURE 1, a building 11 which is typically prefabricated in sections and assembled at the car wash installation site has four brushes 11, 12, 13 and 14 mounted therein in a manner similar to that described in a patent application of Earl Dallas Smith, Ser. No. 447,150 and filed Apr. 12, 1965, and now Patent No. 2,332,098. A number of features are shown schematically in FIGURE 1 and including conveyor 16 extending the length of the building and for moving a vehicle through the building in the direction of the arrow 17 from the building entrance doorway 18 to the exit doorway 19. The brushes 11 and 14 are normally positioned out in the path of the car by means of the pneumatic actuators 21 and 22, respectively, while brushes 12 and 13 are normally retracted from the path of the car by the actuators 23 and 24, respectively. Because the brush 11 is intended to clean the front of the car and particularly the portions thereof to the right of center, as well as the right-hand side thereof, it is referred to as the right front brush. Similarly the brush 14 is referred to as the left front brush. Brush 12 is intended to clean the left-hand side of the car including the portion above the "belt line" as well as the rear of the car from the left side to a point slightly to the right of center. It is therefore referred to as the left rear brush and similarly brush 13 is referred to as the right rear brush. It is these brushes and the controls therefor which are the principal subject matter of the present invention so additional details of the car wash apparatus including the rinsing, soap application, drying, and waxing apparatus will not be described.

The brushes are mounted on brush support frames which, when viewed from above, are generally L-shaped and each frame is mounted by vertical shaft means to the building structure. In this way, each brush frame is swingable on a vertical axis and the brush thereon is therefore swingable also about a vertical shaft axis. For example, right front brush frame 26 is swingable about a vertical axis through the point 27 in FIGURE 1. It is swingable from the position shown by the solid outline to the position shown by the dotted outline at 26r. The outer circles representing the brushes in FIGURE 1 denote the outline thereof when the brush is rotating and the bristles thereof are extended, in contrast to the inner circles representing the outline of the brush as viewed from above when the brush is not rotating and the bristles have collapsed.

Figure 2:
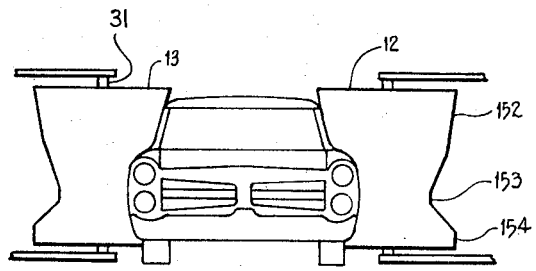
FIG. 2 is an elevational view thereof showing the location of the rear brushes in relationship to the car as viewed from the front, with the brushes applied to the car and rotating.
Figure 3:
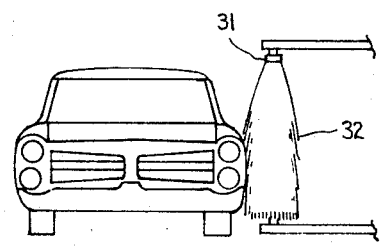
FIG. 3 is a view like FIGURE 2 but showing the rear brushes stopped but engaging the body of the car.

Further elaborating on the type of brushes used, and particularly for the left rear and right rear brushes, reference is made to FIGURES 2 and 3. In FIGURE 2, the left rear and right rear brushes 12 and 13, respectively, are shown working on the car and for this purpose the rear brush arms are swung out somewhat on the vertical axes 28 and 29 respectively from their positions shown by the solid outlines in FIGURE 1. The brushes are rotating so that the bristles thereof are extended substantially horizontally.

However, the brushes are such that when they come to rest, the bristles hang from the upper ends thereof attached to mounting spool means at as 31 (FIGURE 3) to the lower distal or free ends thereof at about the point 32 for the upper row of bristles. Succeeding rows of bristles mounted at various elevations down the spool 31 likewise collapse so that the distal end portions thereof hang substantially vertically when the brush is at rest. In this manner, even if the brushes 13 and 14 are urged against the sides of the car while the brushes are at rest, they do not extend out over the fender tops as they do when rotating, and there is no danger of brushes damaging fender mounted antennas. Means for stopping brush rotation upon sensing the presence of an antenna, according to the present inventon, will be described hereinafter.

Figure 10:
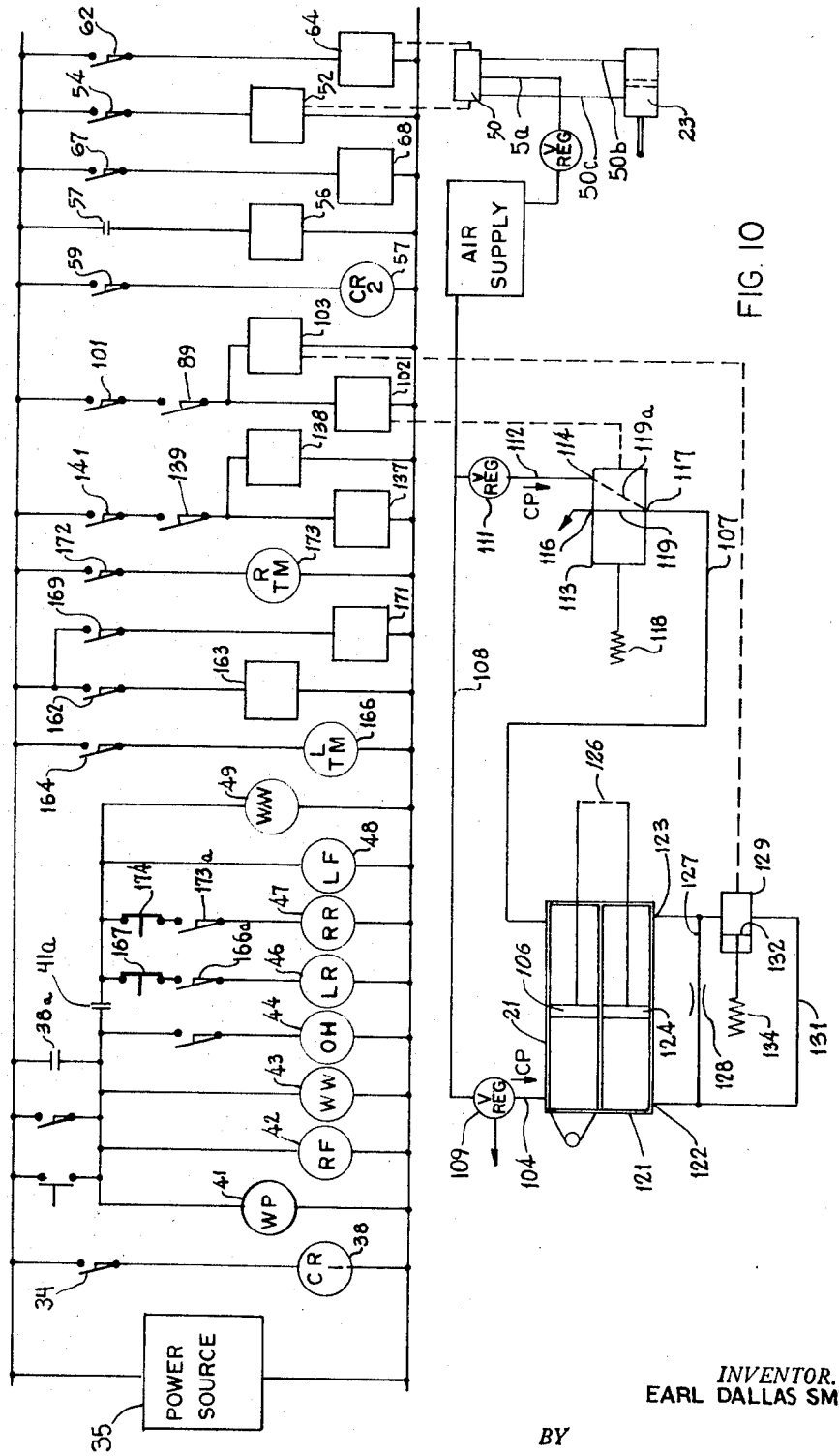
FIG. 10 is a schematic electro-mechanical and pneumatic diagram of the apparatus of the present invention.

It might assist in the understanding of the invention if the usual brush operating sequence is described for the washing of a vehicle having generally a rectangular configuration with no difficult frontal recesses and no antennas. Referring to FIGURE 1, as the car 20 approaches the entrance, it strikes a wand 33 (FIGURE 1) closing switch 34 which will supply electrical energy on the lines 36 and 37 (FIG. 10) from a twenty-four volt source 35, for example, to the control relay 38 (FIG. 10). This closes the normally open contacts 38a of the relay to supply energy to the various coils for motors as follows: 41—water pump, 42—right front brush, 43—left wheel washer motor, 44—overhead brush. These motors are thereby started, as the energized coils connect them to power input busses at four-hundred eighty volts, for example. The coil 42 for the right front brush has normally open auxiliary contacts 41a associated therewith which are closed in response to energization of coil 41 and shortly thereafter to supply energy from lines 36 and 37 to the rest of the motor coils as follows: 46—left rear brush, 47—right rear brush, 48—left front brush, and 49—right wheel washer brush. In this way the initial motor starting current surge is reduced from what it would be if all motors came onto the line simultaneously. So all the brushes are rotating and described outlines in the locations of the outer solid circles in FIG. 1, when viewed from above.

As the car is moved along by the conveyor it enters the building after starting the motors and the front end contacts the right front brush 11 and begins to push it toward the rear of the building and thereby swing it on its frame 26 around the hinge axis 27. By this time soapy water has been applied to the car by suitable nozzles shown schematically at 51 and supplied by the water pump. The right front brush frame movement initiates advance of the left rear brush as will now be described.

The pneumatic actuator 23 for the left rear brush frame is a double acting device and when solenoid 52 (FIG. 10) is energized by closure of switch 54, solenoid valve 50 is shifted to apply air pressure from line 50a through line 50b to the "apply" side of the actuator 23 to advance the frame and left rear brush out into the path of the car. However, in order to avoid moving this brush in front of the car, its action is controlled in response to movement of the right front brush, the later being the first one engaged by the car. For this purpose, a switch box 53 is provided at the right front brush frame shaft and has two cam-operated switches therein. The normally-closed cam-operated switch 54 is one of these and is closed by a cam on the right front brush frame shaft when the front end of the car has moved the right front brush far enough that there is assurance that advance of the left rear brush can safely take place without it moving in front of the car. Normally a swing of approximately fifty degrees from the starting position of brush frame 26 is provided on the cam before the switch 54 is closed to energize solenoid 52 and thereby begin advance of the left rear brush.

As the right front brush swings out, it washes the front end of the car from a point near the center line across to the right and continues along the right hand side of the car as the car is moved along by the conveyer. When the left rear brush is applied by the actuator 23 in response to closure of switch 54 by the right front brush frame, it contacts the left side of the car somewhat behind the front end and washes the left side as the car proceeds through the apparatus. The next brush in the path of the car is the left front brush and it is engaged and moved to the rear end outwardly in the same way as was the right front brush. The action of the left-front brush frame is used to initiate advance of the right rear brush. To accomplish this, the actuator 24 for the right rear brush is also a double acting device and is moved in the brush advancing direction by energization of the solenoid 56 applying pneumatic pressure to one side of the actuator piston. Solenoid 56 is energized upon closure of control relay contacts 57 of the control relay 58. Control relay 58 is energized by closure of the cam-operated switch 59 located in switch box 61 at the pivot shaft for the left front brush frame. Here also the advance of the right rear brush is controlled by the actual response of the left front brush frame to the movement of the car so that the right rear brush will not move in front of the car. This can be accomplished by providing approximately a 50° swing of the left front brush frame before closure of the switch 59 in box 61.

As the car moves along, the left front brush cleans the front end to the left of center as well as the left side. The right rear brush cleans the right side beginning at a point behind the front end but ahead of the windshield and continues along the right side. As the rear end of the car approaches the left rear brush, the left rear brush moves out across the rear end as it cleans the rear end across to the center of the car. The pressure on the actuator 23 maintained by the control valve 50 as set initially by energization of the solenoid 52 accomplishes this. After the left rear brush has moved across the center of the rear end of the car, the right front brush will be released from the side of the car at the right rear end and begins to move across toward the center, as it is advanced again toward its initial position. It then allows the cam-operated switch 54 to open, deenergizing solenoid 52 thus enabling the valve to shift by energization of solenoid 64 to cause actuator 23 to retract the left rear brush into the recess or cubicle where it originally was located. To implement this action, a cam-operated switch 62 (FIGURE 10) located in the switch box 63 and operated by a cam on the left rear brush frame shaft is closed when the left rear brush frame has swung out about 85° from its initial position and advanced the left rear brush to the center of the rear end of the vehicle. Closure of switch 62 by the left rear brush frame when it has finished the rear of the vehicle energizes the solenoid 64, shifting the valve 50 whereby venting the "apply" side of the piston and applying pressure from line 50a through line 50c to the other side of the piston in the actuator 23 and retracting the left rear brush.

As the car continues through the apparatus, the left front brush has passed around the rear end of the car and is beginning to move out to the center of the path whereupon the cam-operated switch in box 61 is again opened, deenergizing control relay 57 and opening the control relay switch contact 57a deenergizing solenoid 56, thus enabling removal of pressure from the advance side of the actuator 24 by the solenoid 68. The right rear brush moves across to the center of the rear end and its shaft is provided with a cam thereon in the switch box 66, which thereupon closes the cam-operated switch 67 therein to energize the solenoid 68 applying pressure to the opposite side of the piston in the actuator cylinder 24 for retraction of the brush from the path of the car. Thereupon the right rear brush is retracted. So it is that the various brushes work on the car in the proper sequence to completely wash it. An overhead brush is also normally used for washing the top portions of the car as well, but because it is not involved in the present invention, it will be described no further herein.

As shown in FIGURE 4, the front end of certain cars has a configuration which will tend to lock the front brush against the car, and which is overcome by one feature of the present invention which will now be described. As shown in FIGURE 4, the right and left front fenders 71 and 72 of the car project well ahead of the front end portions 74 and 76 therebetween, resulting in a sort of pocket as best shown at 78 in FIGURE 7. As the car moves forward in the direction of the arrow 79 and pushes the brush ahead of it, there is a tendency for the brush to become locked in the pocket 78 in some cars and in the absence of the present invention, excessive loading on the brush, the car, and the brush drive motor may result.

In the illustrated embodiment, the tendency to increase the brush load is utilized by mounting the brush drive motor 42 on a base 81 pivotally mounted to the brush support frame 26 for pivoting on a vertical axis at 82. In the illustrated example, the motor sprocket 83 drives the brush sprocket 84 in the clockwise direction indicated by arrow 86 by means of a drive chain 87. The driving run of the chain is designated by 87d and the return run by 87r.

As shown in the enlarged view of FIGURE 6, the motor base 81 is normally aligned parallel with the frame base 88 affixed to the brush support frame 26. A normally open switch 89 is provided with an operating arm and roller 91 engaging the motor base. An adjustment screw 92 is provided with a lock nut 93 and is threadedly received in the plate 88. The spring 94 is selected so that under normal brush load conditions the relationship of the parts illustrated in FIGURE 6 is maintained so that switch 89 remains open. However, if the brush load increases such as occurs when it moves into the pocket 78, the torque increases so that the load on the driving run 87d of the drive chain increases and tips or rocks the motor forward in the direction of the arrow 96 as shown in FIGURE 7. This permits switch 89 to close for a purpose which will soon be described. The extent of forward rocking of the motor is limited by the screw 97 and the initial position and spring tension can be adjusted by the screw 92. A space 98 between the facing ends of screw 97 and screw 99 is such so that the rocking will not be excessive.

The effect of closure of switch 89 will now be described with reference to FIGURE 10 wherein switch 89 is shown in circuit with a switch 101 and the parallel combination of solenoids 102 and 103. The pneumatic actuating cylinder 21 for the right front brush is shown with an air supply line 104 connected to the apply or advance side of the piston 106 and an air line 107 connected to the retract side of the piston. A main air supply line 108 is provided and the bleed-off regulator 109 maintains a pressure of approximately 10 lbs. per square inch in the line 104. The main air line also supplies the regulator 111 which maintains a pressure of approximately 50 lbs. per square inch in the line 112.

A solenoid-operated spring-return valve 113 is provided with one inlet 114 connected to the line 112, an outlet 116 to atmosphere and an outlet 117 connected to line 107 to the cylinder. The valve is shown in its normal position retained by the spring 118 so that the passageway 119 vents line 107 to atmosphere. The solenoid 102, when energized, shifts the valve passageway to connect supply line 112 through port 114 and passageway 119 (shown by the dotted outline) to the line 107 to the cylinder.

There is a hydraulic checking cylinder 121 connected in parallel with the actuating cylinder 21 and having ports 122 and 123 at opposite ends thereof and communicating with opposite sides of the piston 124. The piston 124 is connected to the front brush frame along with the piston 106 as indicated schematically by the dotted line 126. To normally control the rate of return of the front brush to the original position at the center of the path of the car after the car has passed, a passageway 127 is provided between the ports and with a control orifice 128 therein. A solenoid actuated, spring-return valve 129 is provided in a line 131 parallel to the line 127. This valve normally blocks the line 131 but, when solenoid 103 is energized, the valve is shifted so that the passageway 132 therein completes a shunt circuit through the line 131 in parallel with line 127. When solenoid 103 is again deenergized, the spring 134 will return the valve to original condition blocking the line 131.

The means for closing switch 89 in response to brush loading has been described and the effect thereof can now be appreciated by reference to the structure just now described. Upon closure of switch 89 in response to increased brush loading, if switch 101 is also closed at the same time, both solenoids 102 and 103 will be energized. This will apply 50 lbs. per square inch of air through the line 107 to the actuator 21 greatly offsetting the constant force supplied by the 10 lbs. per square inch in line 104. Likewise the energization of solenoid 103 provides a short circuit between the opposite ends of the hydraulic checking cylinder. The effect is to immediately initiate retraction of the right front brush away from the front of the car toward the position shown by the dotted outline in FIGURE 1. However, as soon as the resulting motion of the frame and brush unloads the brush, the motor can return to its initial stable position in FIGURE 6 to open switch 89 and deenergize the two solenoids. Immediately the solenoid valves are shifted to vent the "retract" side of the actuating cylinder 21 and to block the short circuit line 131 of the hydraulic checking cylinder. The 10 lbs. per square inch pressure at the apply side of the actuating cylinder therefore again applies the brush in a manner controlled by the control orifice 128 of the hydraulic checking cylinder.

The foregoing description assumed that switch 101 was closed when the brush loading closed switch 89. Switch 101 is a cam-operated switch located in the switch box 53 at the shaft of the right front brush frame and operated by a cam on that shaft. The switch will remain open until the right front brush frame has moved about 30° from its starting position whereupon the cam on the brush frame shaft closes the switch to enable energization of the solenoids 102 and 103 in the event that the brush load increases thereafter. This feature avoids immediate retraction of the brush due to motor tilting caused by brush starting inertia or due to initial loading of the brush and contact thereof by the front end of the car as it moves through the entrance of the building.

The same arrangement as described for the right front brush is provided for the left front brush including the hydraulic checking cylinder 136 for the actuator 22 and solenoids 137 and 138 for the high pressure application and hydraulic bypass, respectively. Switch 139 is provided at the motor mount in the same way that switch 89 is provided for the right front brush and an enabling switch 141 is provided in the switch box 61 for closure by the left front brush frame after it has been moved an initial amount by the front end of the car. Here again it may be varied somewhat as with the right front brush switch 101. The selection of the desired swing angle before closure of these switches may depend somewhat on the nature of the vehicle being washed. For example, if the conveyor is mounted for engagement of the left wheels of the vehicle to move it through the building as illustrated, an example of such an apparatus being shown in the aforementioned patent application, the left hand side of both narrow and wide cars will be approximately the same distance from the brush frame axes located at the left hand side of the building. However, for a narrow car, the right side will be considerably farther from the brush frame axes at the right of the building than it will be for a wide car. According, a greater degree of swinging of the left front brush frame before closure of switch 141 can be tolerated for the various cars than might be possible for the right front brush frame because the pocketing of the right front brush will occur sooner or later depending upon whether or not the car is narrower or wider. So it is that the present invention provides an ideal apparatus for automatically limiting the brush loads regardless of the size car being washed.

It is desirable to rotate the front brushes in a direction which will automatically tend to remove them from the pockets in the front ends of cars. For example, for the right front brush it has been found desirable to facilitate removal from the pockets to cause the brush to rotate in the clockwise direction when viewed from above as shown in FIGURE 7. Similarly it has been found desirable to rotate the left front brush in the counter-clockwise direction when viewed from above. Certain circumstances may exist which would make it desirable to rotate the brushes oppositely, but in such event the motor mounts and switch arrangements for responding to increased and decreased belt loads would need to be reversed.

Figure 8:
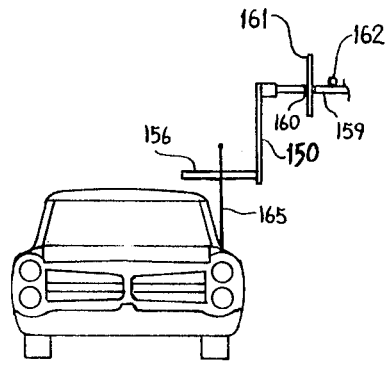
FIG. 8 is an enlarged elevational view of the left-hand antenna wand used for sensing the presence of the antenna shown engaging it, to control the left rear brush.
Figure 9:
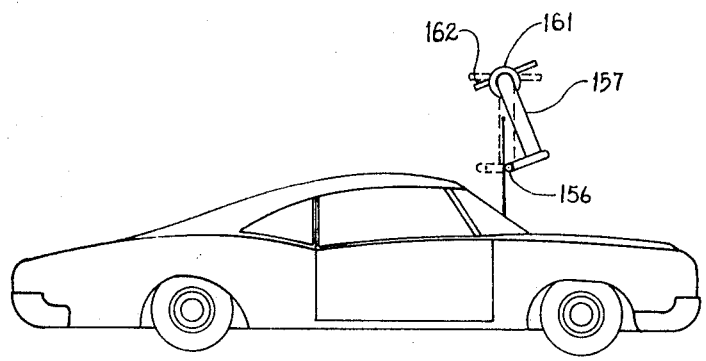
FIG. 9 is an enlarged elevational view like FIGURE 8 but taken at 90 degrees with respect to FIGURE 8 and showing the wand rocked by the car antenna.

Referring again to FIGURES 2 and 3, another feature of the invention serving to unload brushes and vehicle will be described with reference to the left rear and right rear brushes. For best results in cleaning rocker panels as well as the side panels and portions above the belt line, these brushes are provided with bristles of various lengths. For example, beginning at the top of the brush the first group of bristles is made comparatively long so that while the brush is rotating they extend as indicated at 152. The next group proceeding downward is a bit shorter for cleaning the side panels as indicated at 153. The lower group is longer like the top group and as indicated at 154, for cleaning the rocker panels. Because the upper group of bristles must clean windows and side portions above belt lines on vehicles having different widths at this area, these bristles are long enough that in many cases they extend well over the front and rear fenders and in fact serve the additional function of cleaning the tops of the front and rear fenders as illustrated. However, it is well known that many cars provide antennas on top of the front or rear fenders and it is not desirable that the brushes work on these antennas because in many cases the antennas cannot very well withstand the rigors of this, and the brush bristles may wrap around the antenna and pull the antenna off the vehicle. Comparatively few fender mounted antennas are fully retractable so provisions are made according to another feature of this invention to unload the rear brushes in the event than anantenna would be otherwise engaged thereby. For example, referring to the left rear brush 12, while rotating it normally describes an outer circle designated by the solid outline in FIGURE 1. However, when it is advanced by the actuator 23 in response to closure of the switch 54 by the right front brush frame, the brush moves out into the path of the car although, of course, the front of the car has passed the brush. It is continuously urged outwardly against the car by the actuator 23 with a force sufficient to clean the car as it brushes. To protect left fender mounted antennas, antenna sensor wand 156 (FIGURE 1) is provided very near the entrance of the building. Details of this wand are shown in FIGURES 8 and 9, and in one embodiment include an aluminum tube of very light weight and approximately 20 inches long mounted at the lower end of a hanger 157 which is secured at its upper end to a shaft 159 mounted in a bearing 160 secured to the building 161. The shaft is rotatable in the bearing and the wand normally comes to rest at an elevation approximately 64 inches above the floor of the building. A normally open mercury switch 162 is mounted on the shaft 159 and, as shown in FIGURE 10, is located in series with a timer starting magnet 163 across the lines 36 and 37.

In operation, therefore, if the car has a fender mounted antenna 165, the antenna is raised so that it is at least 68 inches above the floor, assuming of course that it is not a fully retractable type of antenna. The antenna strikes the wand 156 as the car moves along and immediately the mercury switch 162 closes. This energizes the timer start magnet 163, thereby closing switch 164 (FIGURE 10) starting the timer motor 166. The timer motor 166 operates the timer cam switch 166a which is in series with the left rear brush motor coil 46, right front brush coil auxiliary contact 41a, a manual stop switch 167 and the control relay contact 38a, across power lines 36–37. Thus the left rear brush timer motor 166 breaks the circuit to the left rear brush motor and the brush stops rotating. The bristles collapse so that they cannot harm the antenna. Even though the actuator may continue to urge the brush against the side of the car, the brush shaft and spool itself will remain outside the path of the car as well as the bristles now being disposed at the side of the path and outwardly therefrom. Thus the brush and the motor therefor are unloaded and so are the vehicle areas where the antenna is mounted. The timer motor keeps the switch 166a open until the antenna has safely passed. Meanwhile, of course, the mercury switch has again opened as the wand settles back to rest and the start magnet switch 164 is open also. When the timer returns to start position, it stops and is ready to go for the next antenna wand encounter.

The same type arrangement is provided for the right rear brush and includes antenna sensor wand 168 normally mounted about two to three feet ahead of the right rear brush shaft axis and out over the path of the car so as to be engaged by right hand fender mounted antennas. This wand controls mercury switch 169 in series with the right brush timer start magnet 171 controlling the normally open switch 172 in series with the right rear brush timer 173. That timer operates the normally closed timer cam switch 173a in series with the normally closed manually operable pushbutton switch 174, control relay contact 38a, contact 41a and right rear brush motor control coil 47.

These antenna sensors are responsive to antennas wherever mounted on the vehicle if they could be encountered by the upper portion of either the left rear or right rear brush. The normally-closed manually operable switches 167 and 174 in series with the left rear and right rear brush motor coils respectively, are useful in the event either of these brushes should be stopped at any time the operator desires to stop them.

It is believed that from the foregoing description, it will be apparent that the present invention provides excellent means for limiting and reducing loads on the brushes, the drive motors and support means therefor, and the vehicle and vehicle components, and then re-establishing proper load situations at the proper times. While the invention has been disclosed and described in some detail in the drawings and foregoing description, they are to be considered as illustrative and not restrictive in character, as other modifications may readily suggest themselves to persons skilled in this art and within the broad scope of the invention, reference being made to the appended claims.

The invention claimed is:

1. Automatic car washing apparatus comprising:
   a stationary mounting structure;
   a first rotary brush mounted to said structure and rotatable in the path of a car to be washed, said brush having bristles normally hanging to a generally vertical attitude at their distal ends, said bristles being extendable by centrifugal force upon rotation of said brush for washing the car;
   brush control means responsive to movement of the car along said path and coupled to said brush and operable in response to the car movement to limit a load on said brush, said brush control means including sensing means responsive to attainment, by a portion of the car, of a predetermined relationship to said mounting structure, to limit a brush load, said control means being thereafter operable to load said brush by application thereof to said car; and
   brush drive means coupled to said brush and operable when energized, to rotate said brush and extend its said bristles for washing the car, said sensing means being coupled to said drive means and operable in response to attainment of said predetermined relationship to temporarily de-energize said drive means and thereby enable said brush to stop and the bristles thereof to discontinue working on the car while said relationship persists.

2. Automatic car washing apparatus comprising:
   a stationary mounting structure;
   a first rotary brush mounted to said structure and rotatable in the path of a car to be washed, said brush having bristles normally hanging to a generally vertical attitude at their distal ends, said bristles being extendable by centrifugal force upon rotation of said brush for washing the car;
   brush control means responsive to movement of the car along said path and coupled to said brush and operable in response to the car movement to limit a load on said brush,
   said brush control means including sensing means responsive to attainment, by a portion of the car, of a predetermined relationship to said mounting structure, to limit a brush load, said control means being thereafter operable to load said brush by application thereof to said car, said sensing means including:
   a wand extending generally horizontally and above and transverse to the direction of said path,
   a hanger suspended from a portion of said mounting structure and pivotable thereon independent of said brush, said wand being secured to and supported by a portion of said hanger, said wand being located at a level below the pivotable mounting of said hanger, and normally disposed in a rest position;
   said control means including a normally-open switch connected to said hanger and closable thereby upon movement of said wand from said rest position.

3. Automatic car washing apparatus comprising:
   a stationary mounting structure;
   a first rotary brush mounted to said structure and rotatable in the path of a car to be washed, said brush having bristles normally hanging to a generally vertical attitude at their distal ends, said bristles being extendabe by centrifugal force upon rotation of said brush for washing the car;
   brush control means responsive to movement of the car along said path and coupled to said brush and operable in response to the car movement to limit a load on said brush, said brush control means including sensing means responsive to attainment, by a portion of the car, of a predetermined relationship to said mounting structure, to limit a brush load, said control means being thereafter operable to load said brush by application thereof to said car,
   said sensing means including a wand extending generally horizontally and above and transverse to the direction of said path,
   a hanger suspended from a portion of said mounting structure and pivotable thereon, said wand being secured to and supported by a portion of said hanger, said wand being located at a level below the pivotable mounting of said hanger, and normally disposed in a rest position;
   said control means further including a normally-open switch connected to said hanger and closable thereby upon movement of said wand from said rest position;
   a source of electrical energy;
   a brush drive motor and a normally-closed timer-operated switch in circuit with said source whereby said motor is energized and drives said brush in rotation;
   said control means including a timer starter magnet in circuit with said source and said wand-operated normally-open switch, and a timer motor and timer control switch in circuit with said source, said timer control switch being operated by said timer magnet when said wand-operated switch is closed, and said timer-operated switch being opened by said timer motor for a period of time predetermined by said timer motor operation, and said timer-operated switch then closing to resume brush drive and washing of said car as said car moves along said path.

4. Automatic car washing apparatus comprising:
   a stationary mounting structure;
   a first rotary brush mounted to said structure and rotatable in the path of a car to be washed, said brush having bristles normally hanging to a generally vertical attitude at their distal ends, said bristles being extendable by centrifugal forces upon rotation of said brush for washing the car;
   brush control means responsive to movement of the car along said path and coupled to said brush and operable in response to the car movement to limit a load on said brush,
   said brush control means including sensing means responsive to attainment, by a portion of the car, of a predetermined relationship to said mounting structure, to limit a brush load, said control means being thereafter operable to load said brush by application thereof to said car,
   said brush being disposed on a generally upstanding axis, and said brush control means further including actuator means coupled to said brush for moving said brush horizontally into said path, said actuator means being operable by said sensing means in one direction to retract said brush from the said path in response to attainment of said relationship.

5. Automatic car washing apparatus comprising:
   a stationary mounting structure;
   a first rotary brush mounted to said structure and rotatable in the path of a car to be washed, said brush having bristles normally hanging to a generally vertical attitude at their distal ends, said bristles being extendable by centrifugal force upon rotation of said brush for washing the car;
   brush control means responsive to movement of the car along said path and coupled to said brush and operable in response to the car movement to limit a load on said brush, said brush control means including sensing means responsive to attainment, by a portion of the car, of a predetermined relationship to said mounting structure, to limit a brush load, said control means being thereafter operable to load said brush by application thereof to said car, said brush control means further including actuator means coupled to said brush for moving said brush into said path, said actuator means being operable by said sensing means in one direction to retract said brush from the said path in response to attainment of said relationship;

brush drive means coupled to said brush and operable, when energized, to rotate said brush, said sensing means being connected to said drive means and responsive to resistance of said brush to rotation on the car surface to operate said actuator means in said one direction and move the brush away from the said surface.

6. Automatic car washing apparatus comprising:

a first rotary brush movably mounted to stationary means to move into the path of the car to be washed;

actuator means coupled to said brush and operable in one direction to retract said brush from a certain position in said path;

brush drive means coupled to said brush for rotation thereof, said drive means being coupled to said actuator means and responsive to a predetermined degree of increased loading on said brush to operate said actuator means in said one direction.

7. The apparatus of claim 6 and further comprising:

a first brush mounting frame swingably mounting said brush to said stationary means;

said brush drive means including a first drive wheel and a second drive wheel and a drive belt engaging said drive wheels to provide power transmission therebetween, said second drive wheel being connected to said brush, and said drive means including rockable mounting means mounting one of said drive wheels to said frame and rockable forward on said frame in response to increases in belt loading, above a certain normal value and said drive means including return means on said frame and engaging said rockable mounting means and opposing the forward rocking of said mounting means to return said mounting means backward to a normal position on said frame upon decrease in belt loading to a normal value.

8. The apparatus of claim 7 and further comprising:

switch means coupled to said actuator means and to said rockable means and operable by movement of said rockable means forward a predetermined amount to operate said actuator means in said one direction.

9. The apparatus of claim 7 wherein:

said actuator means normally urge said brush outwardly to said certain position in the path of a car to be washed, said actuator means being reversible to retract said brush from the said path;

said apparatus further comprising switch means coupled to said actuator means and to said rockable mounting means, said switch means having a normal first condition permitting said actuator means to remain in its said normally outward urging condition and said switch means being operable to a second switcher condition by movement of said rockable mounting means forward a predetermined amount to reverse said actuator means and thereby initiate retraction of said brush from said path to reduce belt loading.

10. The apparatus of claim 9 wherein:

said actuator means include a pneumatic cylinder; said rockable mounting means include a drive motor mounting plate rockably mounted to said brush mounting frame and supporting a brush drive motor thereon, said first drive wheel being connected to said motor; and said switch means include a normally-open switch mounted to said brush frame and having an operator member engaging said mounting plate and operable thereby during rocking thereof.

11. The apparatus of claim 10 wherein:

said pneumatic cylinder has a piston therein and;

said actuator means includes a first source of air at a first pressure coupled to one side of said piston to thereby urge said frame outwardly and apply said brush to the car;

and said actuator means includes a second source of air at a second pressure substantially higher than said first pressure;

said apparatus further comprising a first solenoid valve having a first port coupled to the other side of said piston and a second port to atmosphere and third port to said second source, said valve normally connecting said first port to said second port and operable, when energized, to switch the connection of said first port from said second port to said third port and thereupon overcome the effect of said first source on said piston and move said piston against the pressure applied by said first source and retract said brush frame;

said apparatus including a source of electrical energy, said normally-open switch and said first solenoid valve being in circuit with said energy source whereby said valve is energized upon closure of said switch to retract said frame and said valve is de-energized upon opening of said switch to enable advance of said brush frame by said first air source.

12. The apparatus of claim 11 and further comprising:

a hydraulic checking cylinder associated with said pneumatic cylinder and having a hydraulic piston therein connected to said pneumatic cylinder piston and operable therewith;

a fluid passageway between the interior of said hydraulic cylinder on one side of said piston thereof and the other side of said piston thereof and having a restriction therein to enable but control passage of hydraulic fluid from one side of the hydraulic piston to the other side thereof to limit the rate of movement of said brush frame;

second passageway means in parallel with said restriction and including a second solenoid valve therein, said second valve normally blocking said second passageway means and operable when energized to unblock said second passageway means to enable a more rapid rate of movement of said brush frame, said second solenoid valve being in circuit with said energy source and said normally-open switch for energization when said first solenoid valve is energized.

13. The apparatus of claim 6 wherein:

said first brush is rotatably mounted in a first frame swingable on a generally upstanding axis on said stationary means, said brush being in the path of a car to be washed and engaging the front end of the car, the mounting of said brush frame enabling said first brush to swing across the front end of the car as said brush is moved from said certain position by movement of the car forward along said path and against said brush, said axis being disposed at the right-hand side of the said path, and said first brush being driven in a clockwise direction as viewed from above.

14. Automatic car washing apparatus comprising:

a first rotary brush movably mounted to stationary means to move into the path of the car to be washed;

and antenna sensing means disposed adjacent said path and having a portion movably mounted in a position to be struck by a car-mounted antenna as the car moves along said path;

and control means coupled to said antenna sensing means and to said brush and operable when said sensing means are struck to render said brush inactive.

15. The apparatus of claim 14 and further comprising:

a source of electrical energy;

a brush drive motor and a normally-closed timer-operated switch in circuit with said source whereby said motor is energized and drives said brush in rotation;

said movably mounted portion of said sensing means includes a wand normally disposed in a rest position, said control means including a normally-open mercury switch connected to said wand and closable thereby upon movement of said wand from said rest position by an antenna on said car, said control means including a timer starter magnet in circuit with said source and said wand-operated normally-open switch, and a timer motor and timer control switch in circuit with said source, said timer control switch being operated by said timer magnet when said wand-operated switch is closed, and said timer-operated switch being opened by said timer motor for a period of time predetermined by said timer motor operation, and said timer-operated switch then closing to resume brush drive and washing of said car as said car moves along said path.

16. Automatic car washing apparatus comprising:

a stationary mounting structure;

a first rotary brush mounted to said structure and rotatable in the path of a car to be washed, said brush having a rotational axis normally spaced outward from the side of the path and said brush having bristles normally hanging collapsed at the side of said path when said brush is stationary, said bristles being extendable into said path by centrifugal force upon rotation of said brush for washing the car, brush drive means coupled to said brush for rotation thereof, and antenna sensing means mounted on said structure and having a portion disposed in said path, said sensing means being coupled to said drive means and operable to disable the brush drive upon sensing the movement of a car-mounted antenna along said path, to enable collapse of said bristles and avoid working of said bristles on the antenna.

17. Automatic car washing apparatus comprising:

a first rotary brush movably mounted to stationary means to move into the path of a car to be washed;

brush drive means coupled to said brush for rotation thereof, and loaded by application and rotation of the brush against the car;

and brush control means coupled to said brush and responsive to movement of the car along the path at a time while said brush is being rotated against the car by said drive means, to temporarily reduce the load on said drive means and subsequently reinstate the load on said drive means by rotation of the brush against the car as said car continues movement along said path, said first brush being arranged for cleaning the right side and an end of said car, said apparatus further comprising:

a second rotary brush movably mounted to stationary means to move into the path of said car;

second brush drive means coupled to said second brush for rotation thereof and loaded by application and rotation of the brush against the car;

a second brush control means coupled to said second brush and responsive to movement of the car along the path at a time while said second brush is being rotated against the car by said second drive means, to temporarily reduce the load on said second drive means and subsequently reinstate the load on said second drive means by rotation of said second brush against the car as said car continues movement along said path.

18. The apparatus of claim 17 wherein:

said stationary means is a building, said first brush being mounted on a frame pivoted to said building on an axis to the right side of said path, and said control means for said first brush includes a sensor sensing load on said first brush drive means;

and said second brush is mounted on a frame pivoted to said building on an axis to the left side of said path, said second brush control means including a sensor sensing the presence and location of an antenna on the car.

19. The apparatus of claim 18 wherein:

said second brush control means further includes an actuator responsive to location of said first brush frame to apply said second brush to the car.

References Cited

UNITED STATES PATENTS 3,035,293   5/1962   Larson.
3,251,084   5/1966   Larson et al.
3,292,192   12/1966  Maxwell.
3,332,098   7/1967   Smith.

FOREIGN PATENTS 1,434,676   2/1966   France.

EDWARD L. ROBERTS, *Primary Examiner.*